(12) United States Patent
Meyer et al.

(10) Patent No.: US 12,429,860 B2
(45) Date of Patent: *Sep. 30, 2025

(54) REAL-TIME AI-BASED QUALITY ASSURANCE FOR SEMICONDUCTOR PRODUCTION MACHINES

(71) Applicant: LYNCEUS SAS, Paris (FR)

(72) Inventors: David Meyer, Paris (FR); Guglielmo Montone, Sceaux (FR)

(73) Assignee: LYNCEUS SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,763

(22) Filed: Aug. 7, 2023

(65) Prior Publication Data

US 2023/0384775 A1 Nov. 30, 2023

Related U.S. Application Data

(63) Continuation of application No. 17/704,337, filed on Mar. 25, 2022, now Pat. No. 11,720,088.

(60) Provisional application No. 63/166,744, filed on Mar. 26, 2021.

(51) Int. Cl.
*G05B 19/418* (2006.01)

(52) U.S. Cl.
CPC . *G05B 19/41875* (2013.01); *G05B 19/41865* (2013.01); *G05B 2219/31449* (2013.01); *G05B 2219/32193* (2013.01)

(58) Field of Classification Search
None
See application file for complete search history.

(56) References Cited

U.S. PATENT DOCUMENTS

| | | | | |
|---|---|---|---|---|
| 8,583,263 B2 * | 11/2013 | Hoffberg | ........... | H04N 5/913 700/83 |
| 10,885,259 B2 * | 1/2021 | Baidya | ........... | G06F 30/398 |
| 10,964,606 B2 * | 3/2021 | Shimura | ........... | H01L 21/768 |

(Continued)

OTHER PUBLICATIONS

Yang et al., "A Domain-Driven Approach to Metamodeling in Additive Manufacturing", Aug. 2017, IDETC/CIE2017, proceedings of the ASME 2017 International Design Engineering Technical Conferences and computers and information in Engineering Conference. pp. 1-10 (Year: 2017).*

*Primary Examiner* — Jason Lin
(74) *Attorney, Agent, or Firm* — David H. Judson

(57) ABSTRACT

The subject matter herein provides for AI-based prediction of production defects in association with a production system, such as a semiconductor manufacturing machine. In one embodiment, a method begins by receiving production data from the production system. The production data typically comprises non-homogeneous machine parameters and maintenance data, quality test data, and product and process data. Using the production data, a neural network is trained to model an operation of a given machine in the production system. Preferably, the training involves multi-task learning, transfer learning (e.g., using knowledge obtained with respect to a machine of the same type as the given machine), and a combination of multi-task learning and transfer learning. Once the model is trained, it is associated with the given machine operating environment, wherein it is used to provide quality assurance predictions.

7 Claims, 2 Drawing Sheets

(56) References Cited

U.S. PATENT DOCUMENTS

| | | | |
|---|---|---|---|
| 2008/0057418 A1* | 3/2008 | Seltmann | G03F 7/70633 430/30 |
| 2009/0198635 A1* | 8/2009 | Doddi | G01B 11/24 706/12 |
| 2013/0230797 A1* | 9/2013 | Van Der Sanden | G03F 7/70616 430/30 |
| 2017/0109646 A1* | 4/2017 | David | G03F 7/70625 |
| 2018/0081339 A1* | 3/2018 | Zhu | G05B 19/406 |
| 2018/0300637 A1* | 10/2018 | Yan | G06N 20/00 |
| 2019/0094843 A1* | 3/2019 | Lee | G06N 5/04 |
| 2019/0130659 A1* | 5/2019 | Ide | G07C 5/006 |
| 2019/0370646 A1* | 12/2019 | Rana | G06N 7/01 |
| 2020/0082245 A1* | 3/2020 | Hao | G06N 3/08 |
| 2020/0150622 A1* | 5/2020 | Cai | G05B 23/024 |
| 2020/0151613 A1* | 5/2020 | Yoo | G06F 11/3466 |
| 2020/0166909 A1* | 5/2020 | Noone | G06N 20/00 |
| 2020/0234143 A1* | 7/2020 | Yoon | G06N 3/045 |
| 2022/0171373 A1* | 6/2022 | Chau | C23C 16/52 |

\* cited by examiner

REAL-TIME AI-BASED QUALITY ASSURANCE FOR SEMICONDUCTOR PRODUCTION MACHINES

BACKGROUND

Technical Field

This application relates generally to quality assurance testing for products, such as semiconductor wafers that are produced in manufacturing facilities.

Background of the Related Art

As manufacturing processes grow more complex and sophisticated, production defects become both more common and harder to predict. Indeed, traditional process control techniques, such as Statistical Process Control (SPC), are now too limited to reliably anticipate defects, as they cannot follow multiple machine parameters simultaneously, and they rely on linear underlying models that are not predictive for many use cases. They also rely on manual set-up of thresholds, thereby complicating use in practice. In addition, production data is often fragmented and unbalanced due to the instability inherent to manufacturing processes. Different products, machines or even drifts on the same machine produce heterogeneous and inconsistent data. As a consequence, and despite the need for more advanced anticipation solutions, the penetration of Artificial Intelligence (AI)-based solutions for quality prediction remains limited. This is especially true for more advanced AI techniques, such as neural networks, which perform better in modeling complex systems but require vast amounts of balanced data. As a consequence, and despite the tremendous progress being made in modeling techniques, manufacturers are therefore stuck with legacy solutions and have limited perspective over the implementation of a fully predictive management of their operations, at a time when their profitability is increasingly impacted by this lack of anticipation.

BRIEF SUMMARY

The subject matter herein provides for AI-based prediction of production defects in association with a production system, such as a semiconductor manufacturing machine. In one embodiment, a method begins by receiving production data from the production system. The production data typically comprises non-homogeneous machine parameters and maintenance data, quality test data, and product and process data. Using the production data, a neural network is trained to model an operation of a given machine in the production system. Preferably, the training involves multi-task learning, transfer learning (e.g., using knowledge obtained with respect to a machine of the same type as the given machine), and a combination of multi-task learning and transfer learning. Once the model is trained, it is associated with the given machine operating environment, wherein it is used to provide quality assurance predictions. To this end given process and machine data are received from the given machine and, in real-time, the model generates a prediction associated with a given product processed by the given machine in the production system. For example, the prediction is a probability of a defect on the given product, an expected result of an end-of-line electrical test, an expected result of an in-line test taken as the given product exits the given machine, and the like.

The training of the model and real-time prediction may be provided as a cloud-accessible service. In another embodiment, the model is trained in the cloud, and the model itself is deployed and executed on-premises, e.g., within a semiconductor manufacturing execution system (MES) located in a semiconductor fabrication plant (a "fab").

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION

Figure 1:
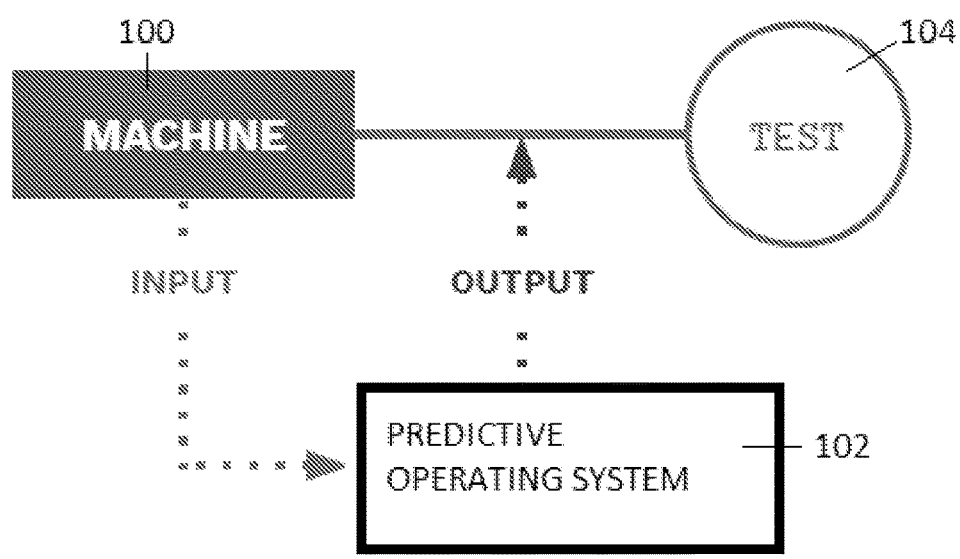
FIG. 1 depicts how the techniques of this disclosure may be implemented as a virtual testing platform in association with a manufacturing machine.

FIG. 1 depicts a simplified representation of the basic operation of the real-time prediction method and system of this disclosure. As shown, production data obtained from a production machine 100 is provided as input to predictive operating system 102. Representative input data comprises machine parameters, maintenance data, characteristics of the product (e.g., a semiconductor wafer) that is being processed by the machine 100, and the like, The input data received from the machine is processed by the predictive operating system 102, which as will be described hosts and executes a machine learning model (or an ensemble of models) that has been trained to provide quality assurance predictions. Based on the received input data, the model provides an output, e.g., a predicted result of one or more quality test(s) that are anticipated to be carried out in the production environment. Using this basic approach, operators of the machine obtain valuable and timely product quality predictions that may then be leveraged within a manufacturing facility to enable these operators to act more proactively, e.g., by making machine and other process adjustments, thereby avoiding future product defects and improving yield. In this manner, the predictive operating system 102 facilitates and improves upon various quality assurance tasks such as, without limitation, data driven sampling (calculating a probability of defect for each unit produced indicating which units to test), real-time monitoring (monitoring machine performance in real-time and issuing alerts in case of anomaly), root cause analysis (identifying patterns in production data that can explain recurring defects), and the like, all in real-time and with minimal disruption.

Model Training

As noted above, the model used by the predictive operating system is trained off-line, i.e., prior to its use in providing real-time predictions. Typically, the model used for prediction is associated with a given machine, although the model may itself leverage knowledge (e.g., about some other machine of the same type) obtained via transfer learning. Transfer learning (use of adjacent data to extract information from similar machines) is valuable in the context where the amount of production data from the machine being modeled presently is sparse.

Generalizing, the predictive operating system receives various types of production data. By way of background, during the typical production of a wafer on a given machine, a number of process variables are sampled by the machine. For example, and for a particular wafer being produced in the machine, variables may include temperature, pressure within the machine, gas flow rate, and many more. During the model training phase, the production data (FIG. 1, "input data") received by the predictive operating system for a given machine may include a data set (e.g., in the form of an input vector) comprising a large set of process variables and the associated measured values that were obtained in situ as the product was processed within the machine. This data thus represents the conditions that existed within the machine at the time of the sampling. In addition, the production data also includes additional data representing the results of quality tests (e.g., resistance tests, critical dimensions test, breakdown voltage tests, etc.) on some percentage of the products that have been processed through the machine. Typically, in an overall production data set received by the operating system the percentage of products (e.g., wafers) that have been subjected to quality testing is small (e.g., 5%). Thus, the production data often includes both (i) labeled data, representing the machine parameters etc. measured inside the machine during the processing, together with the associated quality test results, and (ii) unlabeled data, representing the machine parameters, etc. measured inside the machine during the processing but wherein no quality test results are provided. The labeled data provides a balance to the unlabeled data, thereby improving the predictions available from the model.

For training, one or more tasks are executed in accordance with a multi-task learning paradigm. Multi-task learning generally consists of simultaneously training a neural network on several tasks. One task uses the production data (or some portion thereof) to train the model to predict a result of an anticipated end-of-line electrical test for the product when processing is completed. Another task uses the production (or some portion thereof) to predict a result of an anticipated in-line test, e.g., a test taken at the output of the given machine. Preferably, the end-of-line and in-line predictions are done at the same time. In the approach herein, the modeling enables a determination regarding whether the in-line test itself is good at predicting an anticipated failure at the end-of-line; stated more generally, the technique enables the operator to understand how a particular in-line test actually correlates with the end-of-line test. Anther task uses the production data (or some portion thereof) to identify a feature set that identifies relationships between one or more of the variables reflected in the input vector; in this manner, the input vector (e.g., comprising ten (10) distinct process variables) is compressed into a dimensionally-reduced vector (e.g., comprising just five (5) process variable relationships) that the model learns are predictive. These tasks may be carried out to provide the multi-task learning.

Figure 2:
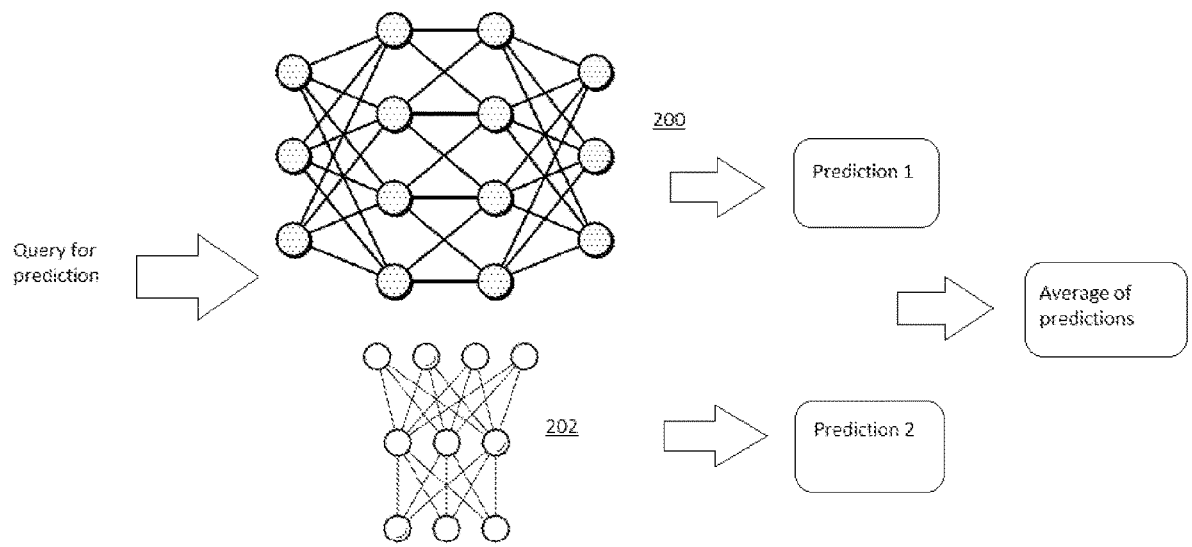
FIG. 2 depicts an ensemble of models being used to provide prediction(s) associated with a production machine.

In a typical solution, and with respect to a given production machine, there may be an ensemble of models that are trained using the above-described techniques, or combinations thereof. This is depicted in FIG. 2, which shows an ensemble 200 comprising a first model (in this case, a deep neural network (DNN)) 200 that has been trained using multi-task learning, and a second model 202 that has been trained via transfer learning. Each of the models within the ensemble may have a different architecture, but preferably all use the historical production data for training. Thus, for example, one model may be a deep neural network (DNN), while another model leverages some other machine learning technique (e.g., Random Forest, KNN, etc.).

Formally, a NN is a function g: X→Y, where X is an input space, and Y is an output space representing a categorical set in a classification setting (or a real number in a regression setting). For a sample x that is an element of X, $g(x)=f_L(f_{L-1}( \ldots ((f_1(x))))$. Each $f_i$ represents a layer, and $f_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes. Other machine learning algorithms that be leveraged include, without limitation, vector autoregressive modeling (e.g., Autoregressive Integrated Moving Average (ARIMA)), state space modeling (e.g., using a Kalman filter), a Hidden Markov Model (HMM), recurrent neural network (RNN) modeling, RNN with long short-term memory (LSTM), Random Forests, Generalized Linear Models, Extreme Gradient Boosting, Extreme Random Trees, and others. By applying these modeling techniques, new types of features are extracted, e.g., as follows: model parameters (e.g., coefficients for dynamics, noise variance, etc.), latent states, and predicted values for a next couple of observation periods.

Figure 3:
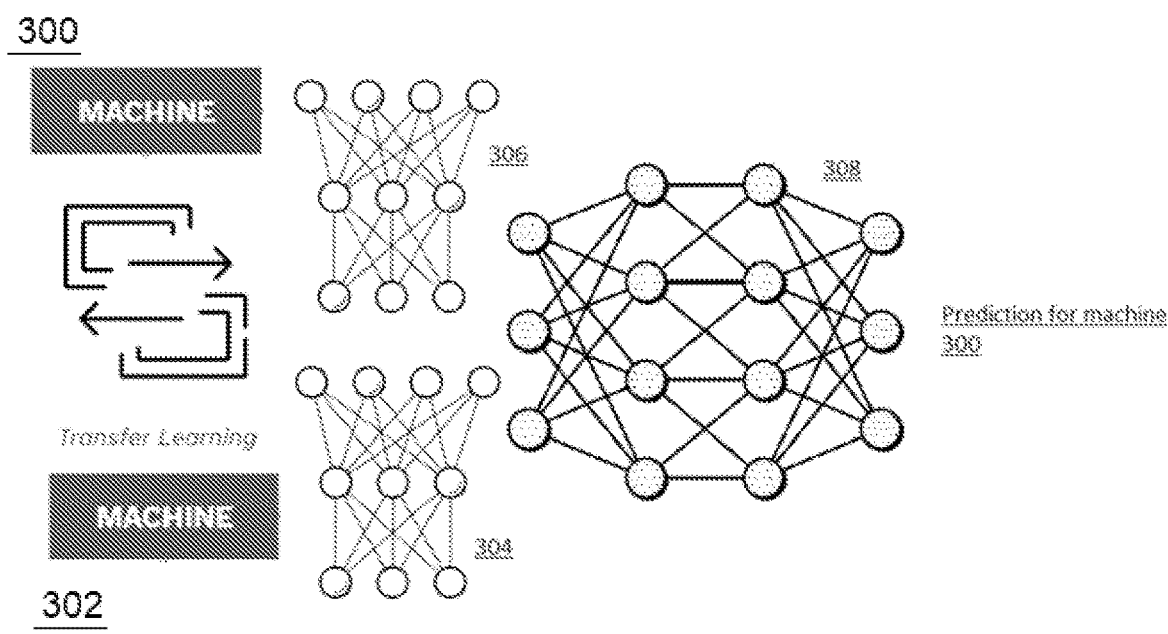
FIG. 3 depicts how transfer learning is used in association with a deep neural network to train a production machine-specific quality assurance predictive algorithm according to an embodiment.

In addition, the training also preferably leverages transfer learning. In machine learning, transfer learning is the notion of storing knowledge gained while solving one problem and applying it to a different but related problem. Here, the knowledge gained while solving one problem comprises a model that has been developed for another machine of the same type as the given machine for which the current model is being trained. The two machines do the same processing within the context of the production environment, but there may be only sparse data available for the production machine for which the current model is being trained. In this embodiment, and with reference to FIG. 3, there are two production machines 300 and 302 of the same type. The target model is being developed for the current production machine 300, but it is assumed that the production data for this machine is sparse (although this is not a requirement). In this context, the production data from the second machine 302 is used to train a first model 304, and whatever production data is available for the current machine 300 is used to train a second model 306. The first and second models 304 and 306 and are then positioned as sub-networks in front of a deep neural network (DNN) 308 that will be trained to make predictions for the current machine of interest. The respective production data used during the training of the first and second models is then re-applied, and the DNN is trained. In this manner, the knowledge obtained from the second machine 302 is transferred to the model used to generate predictions for the current machine 300. In this example, the DNN represents a common representation of the machines 300 and 302, while the sub-networks represent machine-specific models.

The transfer learning technique here described is part of a broader class of techniques usually referred to "domain transfer." Other strategies for domain transfer, such as those involving generative adversarial networks (GAN), and techniques of style transfer, may also be used.

Figure 4:
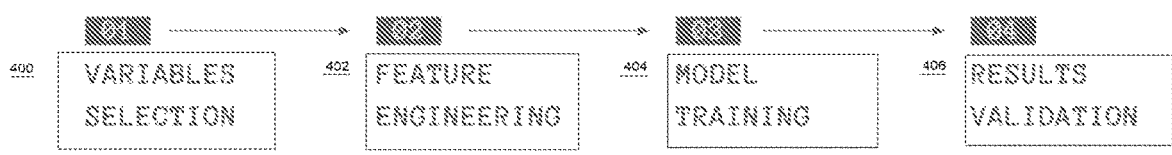
FIG. 4 depicts a generalized modeling methodology for use in or in association with the predictive operating system of this disclosure.

The modeling techniques described above provide for a generalized modeling methodology, which is now described. With reference to FIG. 4, the methodology begins with a variable selection phase 400, namely, the selection of one or more variables that are deemed representative of a process to be modeled. Often, the variable selection is based on or otherwise leverages domain expertise (e.g., for a particular machine). Variable selection may also be informed from physics-based, failure mode analysis with respect to the process being modeled. Thereafter, the methodology leverages a feature engineering phase 402 by which, for one or more of the variables selected, informative data is isolated while noise eliminated or reduced, once again with respect to the process specifications. Following the feature engineering phase, a model training phase 404 is carried out, e.g., using the multi-task and transfer learning techniques to provide increased robustness. In particular, and as described herein, this phase involves finding a best architecture and model parameters, and training the model with constraints to push robustness (e.g., via transfer learning). After model training, a results validation phase 406 is implemented to validate predictions, e.g., against actual measurements and electrical test results. This phase typically involves recreating the production conditions (not a randomly-extracted test set but, rather, one that reflects real life conditions), and preferably using a most recent part data set for testing.

Production Deployment

To deploy a solution on a production line (e.g., in a fab), the predictive algorithm is trained on the historical production data that typically includes the process parameters, the results of quality tests, etc. Once the model (or model ensemble) is trained, it is deployed into production. Typically, deployment involves two (2) communications channels (as shown in FIG. 1), a first channel from a database (usually located on-premises) and that provides process data in real-time or substantially real-time so that the predictive operating system; the production data may be provided from the database, or the predictive operating system can query that database in real-time. A second communications channel is provided from the predictive operating system to the production system to enable sharing of the prediction(s). A given prediction may be coarse- or fine-granted (e.g., even for each unit produced). In one embodiment, the production system is a semiconductor manufacturing execution system (MES), but this is not a requirement. The particular interface provided by the production system may vary. Further, there is no restriction on the type of response that the production system may take in response to receipt of a prediction.

Of course, the nature of the prediction may vary depending on the production machine for which the model (or model ensemble) has been trained, For example, for a plasma etching machine, the prediction may be of a deep trench sidewall angle value, or the dimensions of an etch. To provide a more concrete example, the algorithm may predict simultaneously the value of critical dimensions of the etch and the value/failure of corresponding end-of-line probe tests. For a chemical vapor deposition (CVD) machine, the prediction may be of a wafer resistance parameter. For example, the algorithm may predict simultaneously the value of sheet resistivity (RS) and breakdown voltage oxide (BVox), and the value/failure of corresponding end of line electrical probe tests. For a machine that performs chemical mechanical planarization (CMP), the prediction may be whether a given wafer will exhibit normal polish classification or an under/over classification. For example, the algorithm may classify simultaneously wafer polish and predict the value/failure of corresponding end-of-line probe tests. Other predictions for other types of machines (e.g., an ion implantation machine) are likewise provided. Typically, electrical tests are performed at the end-of-line, but predictions about these EOL tests can also be influenced by predictions associated with in-line physical tests. Thus, a particular prediction regarding an in-line test may also be useful in predicting a particular expected EOL outcome. The above-described examples are not intended to be limiting.

In one example implementation, the model or model ensemble is trained in a cloud or other network-accessible compute environment, and thereafter the model is instantiated and run as a binary on computing resources within the physical production environment. The model may be instantiated in a container-type environment (e.g., a Docker image) and physically delivered to and hosted within the local production environment. In an alternative, both the training (model production) and real-time prediction are done remotely from the production environment. In another embodiment, both the training and real-time prediction occur on-premises. Typically, a hybrid deployment approach is used.

The model or model ensemble is periodically re-trained using historical data, e.g., once per month.

The techniques herein have significant advantages. The solution provides optimal and stable predictive performance in any type of production environments, and is able to model complex systems (the production machines) reliably, and in a scalable, highly-available manner. Predictions are robust, even where data is limited, as the use of transfer learning in particular enables the learning to leverage similar sources of data (e.g., from machines of the same type). Further, the approach seamlessly integrates readily into the production environment (with no ramp-up required) and maintains accurate and timely performance predictions even as changes are made in the production process. The high predictive performance is carried out without requiring changes to the production system or testing protocols, and irrespective of the density or sparsity of the production itself that is made available to the system. A typical prediction is simple to absorb and make actionable. For each unit and in real-time, engineers within the production environment know if a particular unit is or is not defective. The approach gives manufacturers visibility at every step of their manufacturing process at scale as soon as the model is deployed, enabling both significant yield improvements and cost savings. By leveraging deep and transfer learning, often together, the development and deployment of advanced models is enabled, even for limited and unbalanced data. Deep learning as has been described enables the system to model the non-linear systems (such as machines), extracting features and generalizing to establish complex relationships between and among multiple parameters represented in the production data. Transfer learning optimizes the training of the deep learning model by allowing for the use of similar sources of data to model the target dataset. Concretely, if it is desired to predict defects on a given product processed by a given machine, the system uses data relative to other products and other machines to complete this task. Transfer learning is quite valuable in modeling sparse production data by lowering data requirement to achieve high predictive performance on a given use case through the use of adjacent data sources, and by enabling stable predictive performance over time by supporting changes in manufacturing process (such as machine mismatch, drift, or introduction of new products). Combining deep and transfer learning enables quality prediction, concretely enabling the deployment of neural networks on production data and thereby empowering manufacturers with the most performant models available.

As noted above, the nature of the performance prediction(s) that are generated by the modeling approach of this disclosure may vary. They include, without limitation, in-line yield (the results of in-line quality tests), electrical test yield (e.g., the results of end-of-line quality tests), end yield (the results of final quality tests, e.g., post packaging), integration tests (the results of integration tests, e.g., for a chip as part of a larger component), field performance tests (e.g., longevity, product returns, expected versus real performance, etc.), and the like.

EXAMPLES

In a first example use case, the production machine is a Centura® Etch system manufactured by Applied Materials, Inc. of Santa Clara, California. In this example, the process variables that were selected are chamber pressure, throttle valve position, RF hours, bias power, source power, $O_2$ flow, HBr flow, cathode temperature, wall temperature, and convection pressure. The model architecture implemented is an attention-based artificial neural network. This architecture is a Deep Neural Network (DNN), and the output is obtained by passing the input through a sequence of processing layers. The computation in the layers in characterized by the following: every layer has an attention-based module for the pre-processing of the input; and every layer shares a part of the parameters with other layers to reduce overfitting. The processing in every layer is divided into two main steps, namely, an input filtering step, and a feature-transformer step. The input filtering step is the attention-based mechanism; this operation analyzes the input and filters-out non-relevant input features. In feature-transformation, the remaining features are transformed/processed and the output is sent to the next layer. Every feature-transformer is actually constituted by a small neural network. In this example, the attention-based artificial neural network has fifteen (15) layers and is pre-trained on unlabeled data. In particular, during the training phase multi-task learning is applied to predict critical dimensions for several product types with the same model. Further, data augmentation is used to boost the model training. The data augmentation uses unlabeled data. e.g., untested wafers for which there is input data but no critical dimension measurements. The trained model provides a prediction with a reliability score, together with a feature importance analysis that explains which input variables drive the prediction. The real-time prediction(s) provided are then used as input to control one or more automation systems used in the semiconductor production environment. Representative automation systems include automated material handling systems, alerting systems, and various Advanced Process Control (APC) techniques and technologies implemented within the fab. How a particular prediction generated is used for control purposes depends on the machine and the particular production process. Thus, for example, in certain cases the prediction is used to initiate an interdiction, which stops the machine or otherwise interrupts some processing operation so that additional wafers are not loaded, all while necessary parameter tuning or machine maintenance is carried out. In an alternative, the machine processing continues but the prediction enables one or more of the parameters (e.g., the process variables identified above) to be tuned dynamically, e.g., via the APC mechanisms. In another example, the prediction is used to drive back-end notification or alarm systems. Generalizing, the techniques herein real-time prediction(s) that are then integrated into the existing production machine workflow, preferably with the prediction(s) driving the back-end workflow changes in an automated manner, thereby improving the underlying process control systems within the fab.

In the above example scenario, the modeling approach was found to have enabled a 90% reduction in average time to detect etch-related faults, and the approach enabled the user to reduce the frequency of critical dimension measurements that were previously required, and to monitor quality through virtual testing.

In a second example use case, the production machine is a lithography machine, and the process variables are exposure dose, throughput, beam alignment parameters, and wafer positioning coordinates. The model architecture was again an attention-based artificial neural network of the type described above. The training phase included multi-task learning (predicting litho critical dimensions for several technologies with the same model), and data augmentation to boost model training, once again using unlabeled data such as untested wafers for which there is input data but no litho critical dimension measurement(s). As implemented, the prediction returned included a reliability score, together with a feature importance analysis. This approach was found to have enabled a 70+% reduction in litho critical dimension sampling frequency, and it enabled the user to spot early wafers to be reworked. The approach can be expanded to use post-litho CVD prediction for subsequent etching process parameter tuning.

The above examples are representative of the methodology, but they are not intended to be limiting.

Enabling Technologies

Typically, the predictive operating system of this disclosure is managed and operated "as-a-service" by a service provider entity. In one embodiment, a computing platform on which the predictive operating system executes is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid. Although typically the platform is network-accessible, e.g., via the publicly-routed Internet, the computing system may be implemented in a standalone or on-premises manner. In addition, one or more of the identified components may interoperate with some other enterprise computing system or application.

One or more functions of the computing platform of this disclosure may be implemented in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the machine learning techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The techniques herein provide for improvements to another technology or technical field, i.e., semiconductor production manufacturing. As has been described, the techniques find specific practical application in improving operations associated with production machines and their associated workflows in advanced fabrication facilities, typically wherein production is completely automated and carried out in a hermetically sealed nitrogen environment to improve yield (the percent of microchips that function correctly in a wafer), with automated material handling systems used to transport wafers from machine to machine. The modeling and prediction techniques also provide for improvements to the operations of particular production machines, all as has been described above.

We claim:

1. A method for process control in association with a production system that generates production data, wherein the production data comprises non-homogeneous machine parameters and one of: maintenance data, quality test data, and product and process data, comprising:
   prior to training a neural network to model an operation of a machine in the production system:
   without reference to the production data of the production system, applying domain-specific knowledge about a given machine type or production process step in the production system to identify one or more process variables and, for a given process variable so identified, identifying a feature;
   isolating, from received production data, informative data associated with the identified feature;
   using at least the informative data isolated from the production data, training the neural network to model the operation of a given machine in the production system, wherein the training includes data augmentation;
   following completion of the training, receiving given process and machine data associated with the given machine and, in real-time, using the neural network to generate a prediction associated with a given product processed by the given machine in the production system, the prediction having an associated reliability index;
   based on the prediction, generating signaling to control an advanced process control (APC) associated with the production system; and
   applying the signaling to the APC, thereby controlling a workflow associated with the given machine.

2. The method as described in claim 1, further including generating a feature importance analysis in association with the prediction and the reliability index, the feature importance analysis identifying one or more of the process variables associated with the prediction.

3. The method as described in claim 1, wherein the data augmentation uses unlabeled data drawn from the production data.

4. A method for process control in association with a production system that generates production data, wherein the production data comprises non-homogeneous machine parameters and one of: maintenance data, quality test data, and product and process data, comprising:
   prior to training a neural network to model an operation of a machine in the production system:
   without reference to the production data of the production system, applying domain-specific knowledge about a given machine type or production process step in the production system to identify one or more process variables and, for a given process variable so identified, identifying a feature;
   isolating, from received production data, informative data associated with the identified feature;
   using at least the informative data isolated from the production data, training the neural network to model the operation of a given machine in the production system;
   following completion of the training, receiving given process and machine data associated with the given machine and, in real-time, using the neural network to generate a prediction associated with a given product processed by the given machine in the production system;
   based on the prediction, generating signaling to control an advanced process control (APC) associated with the production system; and
   applying the signaling to the APC, thereby controlling a workflow in the production system.

5. The method as described in claim 4, further including generating a reliability index associated with the prediction.

6. The method as described in claim 4, further including generating a feature importance analysis associated with the prediction, the feature importance analysis identifying one or more of the process variables associated with the prediction.

7. The method as described in claim 4, wherein training includes data augmentation using unlabeled data drawn from the production data.

* * * * *